United States Patent [19]

Whitney

[11] Patent Number: 4,727,572

[45] Date of Patent: Feb. 23, 1988

[54] TELEPHONE ANNUNCIATOR WITH LOW BATTERY INDICATION

[76] Inventor: W. W. Whitney, 1341 Ocean Ave., Santa Monica, Calif. 90401

[21] Appl. No.: 916,023

[22] Filed: Oct. 6, 1986

[51] Int. Cl.⁴ ............................................. H04M 1/00
[52] U.S. Cl. .................................. 379/374; 379/375; 379/376
[58] Field of Search .............. 379/396, 418, 442, 374, 379/375, 387, 376, 372, 373; 340/384 E, 636

[56] References Cited

U.S. PATENT DOCUMENTS

| | | | |
|---|---|---|---|
| 3,688,038 | 8/1972 | Hugyecz et al. | 379/372 |
| 3,772,470 | 11/1973 | Cowpland et al. | 379/375 |
| 4,184,053 | 1/1980 | Saneyoshi | 379/373 |
| 4,480,153 | 10/1984 | Festa | 379/374 |
| 4,653,087 | 3/1987 | Galich | 379/373 |

Primary Examiner—James L. Dwyer
Attorney, Agent, or Firm—Gilbert Kivenson

[57] ABSTRACT

A system for producing alternate summoning signals for telephones is described. The system is interposed between a conventional telephone and the telephone line. When a ringing signal occurs, the conventional ringer is silenced and replaced by a musical selection, a chime, a light display or other signal. The system is battery powered. When the battery voltage drops, the summoning signal changes to a continuous tone indicating the need for battery replacement.

4 Claims, 2 Drawing Figures

TELEPHONE ANNUNCIATOR WITH LOW BATTERY INDICATION

BACKGROUND AND OBJECTIVES OF THE INVENTION

The present invention relates to a telephone attachment which permits the user to select from a variety of indicating signals. The classic method for indication of an incoming telephone call has been the electromechanical bell. More recently electronically driven sounding devies—tone ringer—shave begun to replace the bell. Both methods tend however to jar the listener into immediate attention or to abruptly disturb a conversion.An alternate signaling means would frequently be desirable. It is often found that a musical passage or chimes are a gentler method for drawing attention to an incoming call. In other cases the user might prefer some novel sound rather than the conventional pulsed ring. A short voice message, the sound of a waterfall or a flashing light display would be examples of alternate summoning signals which would be desirable or advantageous for certain telephone locations.

It is one objective of the present invention to provide a telephone attachment which will permit a number of output devices to be readily operated from the present ringer signal.

It is a second objective of the present invention to be operable from an internal battery and to operate an output device from the same battery. This will make the invention useable with telephones which are not located near power receptacles.

It is a third objective of the present invention to incorporate a low-battery voltage detection circuit which will switch off the output device and switch in a low current,audio signal source to respond to incoming calls and thus to indicate that the battery needs to be replaced.

It is a fourth objective of the present invention to provide a convenience switch to permit the return of the system to conventional operation of the telephone.

These and other objectives will be explained with reference to FIGS. 1 and 2.

DESCRIPTION OF THE INVENTION

Figure 1:
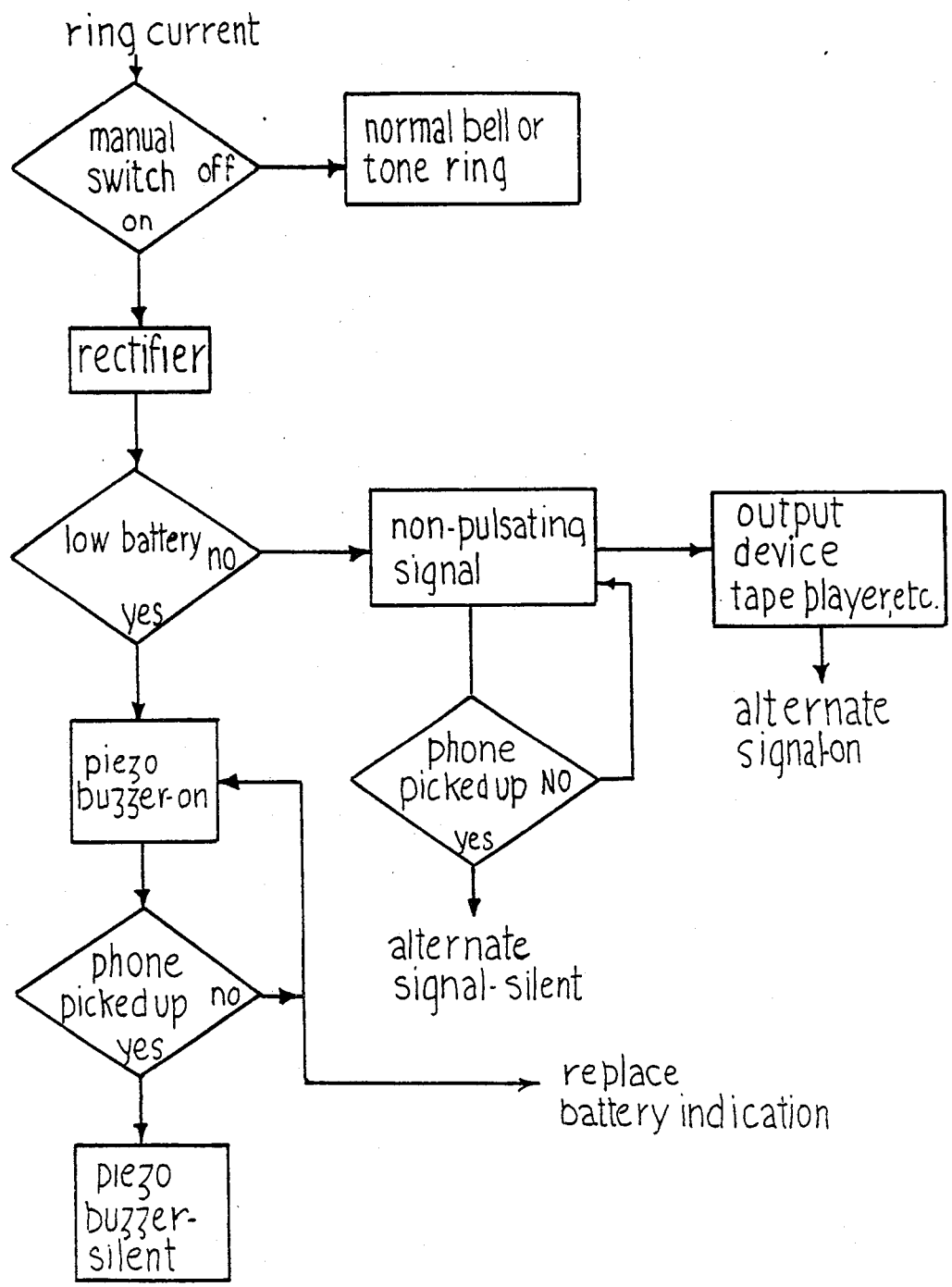
FIG. 1 is a block, logic diagram of the invention indicating the various modes of operation.

The functional operation of the invention will first be explained with reference to FIG. 1. After the telephone set is first plugged into the invention and the invention into the telephone line, the user turns the built in switch to "off" or "on". In the "off" position the switch bypasses the invention; the telephone and its conventional ringer operates as before. In the "on" position the ringing signal is passed through a filtering circuit resulting in its conversion to a series of DC pulses each lasting as long as the original ringing signal. If an internal battery in the invention is producing full voltage, the circuit applies this EMF to an output signaling device; the latter may be a tape player, a motor driven music box, a voice chip and amplifier, a chime, etc. A short musical selection,a recitation, a natural sound (waterfall or birdcall, e.g.) substitutes for the conventional series of rings. In this mode the invention applies a steady voltage to the output device, i.e. there is no fall off and resumption with each incoming ringer signal. If the phone is picked up for answering, the invention cuts off the substitute signal.

When the internal battery can no longer apply its full voltage and an incoming signal occurs, the low voltage is sensed and the circuit prevents the connection of the battery to the output device. A local oscillator, which operates well on reduced voltage, is then turned on and connected to a low current piezo-driven buzzer. The user is alerted to the incoming call and also learns that the battery needs replacement.

Figure 2:
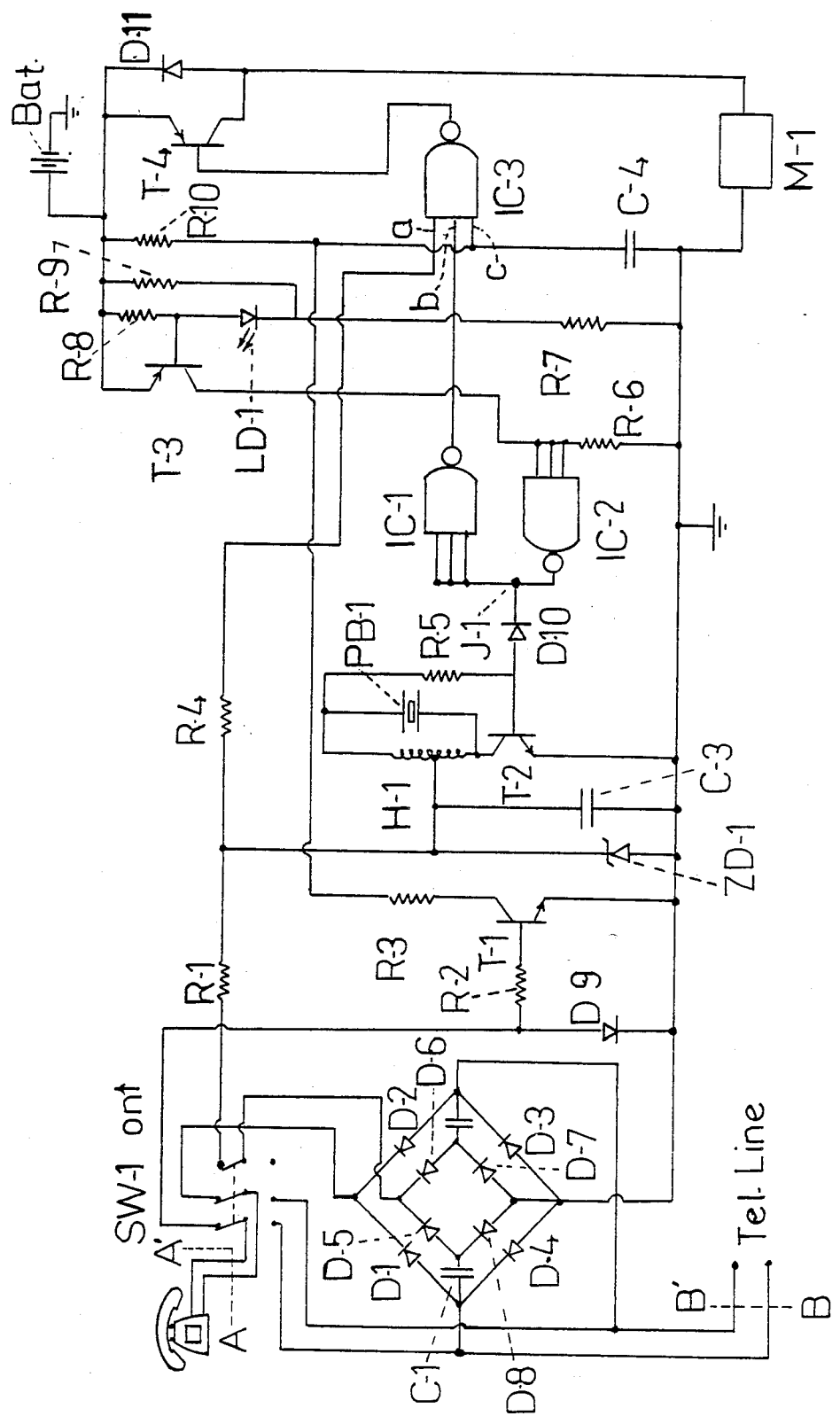
FIG. 2 is a schematic diagram showing the wiring and electronic layout of the invention.

The circuit design of the invention will be explained with reference to FIG. 2. A telephone set is plugged into one terminal of the case containing the invention at A-A'. The telephone line is plugged into a second terminal B-B'. A triple pole, double throw switch SW-1 controls the "on"-"off" function. In the "off" position of SW-1 the telephone set is connected to the telephone line; operation is normal. When SW-1 is turned "on", the telephone line is connected across the outer bridge made up of the diodes D1,D2, D3, and D4 and is capacitor coupled to an inner bridge made up of the diodes D5,D6,D7 and D8. The outer bridge rectifies the AC in a ringing signal and thus prevents it from activating the ringer in the telephone set. The occurence of a ringing signal also produces a DC derived voltage in the inner bridge. This voltage is applied through R-1 to both a piezo buzzer PB-1 and an electronic oscillator—transistor T-2, resistor R-5 and oscillator coil H-1. Zener diode ZD-1 regulates the derived voltage to prevent damage to the circuit when ringer peak voltages occur.

Transistor T-3,resistors R-7 and R-8 and the light emitting diode LD -1 form a "low-battery" voltage sensor circuit. If the battery voltage is sufficient and a phone ringing signal occurs, transistor T-3's collector voltage is high; this results in the voltage at the junction J-1 (between the output of IC-2 and the diode D-10) being low. Transistor T-2 is thus prevented from oscillating. In addition, a high "and" condition is obtained on terminal b of the integrated circuit IC-3. Under this condition the base of T-4 is forward biased, turning it on and applying the battery current to an output device M-1 which may be a tape player or other mechanism as previously explained. When the ringing signal stops, the voltage at R-4 drops,causing IC-3 to remove bias from T-4. The latter stops conducting and M-1 ceases operation. A similar result is obtained if the phone receiver is picked up. Line current now flows through diode D-9, biasing T-1 to conduction. This adds a zero "and" condition to IC-3 which makes T-4 non-conducting.

Capacitor C-4 maintains DC on IC-3 to overcome the effect of pulsations of the ringing signal.

When the battery becomes low, IC-3 prevents the output device M-1 from being actuated. Collector voltage of T-3 is low with the result that T-2 turns on and begins oscillating. The piezodriven buzzer PB-1 is activated and summons the user as well as indicates the low condition of the battery. LD-1 provides a fixed voltage reference.

The output device may be integral with the case in which the invention is housed or may be external and plugged into the case. Various light displays using additional power supplies may also be incorporated into the output. It will be apparent that the above described circuit is one embodiment of a number of arrangements which will achieve the stated objectives without departing from the spirit of the invention.

I claim:

1. A system to be used with a telephone for producing a plurality of annunciating signals comprising:
   (a) a rectifying circuit for converting intermittent ringing signals to pulsating direct current;
   (b) a self monitoring battery power supply including adequate and inadequate battery voltage detection;
   (c) an electronic switching circuit for connecting said power supply to a primary signal producing and annunciating means upon detection of both said direct current and said adequate battery voltage;
   (d) an internal, low current oscillator and secondary producing means producing a continuous tone which is automatically activated in response to both detection of said direct current and inadequate battery voltage; whereby the system, when connected between said telephone and telephone line, will convert a ringing signal to a desired primary annunciating signal or to a continuous, secondary tone if the battery voltage is inadequate, either type of annunciating signal ceasing when the telephone receiver of said telephone is picked up.

2. A system to be used with a telephone as described in claim 1, in which said primary annunciating signal comprises any one of a tape player, an electrically driven music box, a set of chimes, a voice chip or a light display.

3. A system to be used with a telephone as described in claim 1 in which said electronic switching circuit for connecting the battery power source to said primary annunciating signal means incorporates a logic circuit.

4. A system to be used with a telephone as described in claim 1 in which said electronic switching circuit removes battery voltage from the primary annunciating signal means, activates said internal oscillator and applies oscillator output to said low current, secondary tone device when:
   (a) an incoming ringing signal or said telephone line generates said pulsating Direct Current;
   (b) said telephone receive has not been picked up;
   (c) the internal battery voltage is inadequate.

* * * * *